Dec. 23, 1924.  1,520,321

G. H. BINDON

ELECTRIC COOKER OR HEATING UNIT

Original Filed Feb. 16, 1923   2 Sheets-Sheet 1

INVENTOR
GEORGE. H. BINDON.
BY
ATT'YS.

Dec. 23, 1924.

G. H. BINDON 1,520,321

ELECTRIC COOKER OR HEATING UNIT

Original Filed Feb. 16, 1923   2 Sheets-Sheet 2

INVENTOR
GEORGE. H. BINDON.
BY Fetherstonhaugh & Co
ATTYS.

Patented Dec. 23, 1924.

1,520,321

UNITED STATES PATENT OFFICE.

GEORGE HEDLEY BINDON, OF OTTAWA, ONTARIO, CANADA.

ELECTRIC COOKER OR HEATING UNIT.

Application filed February 16, 1923, Serial No. 619,430. Renewed November 17, 1924.

*To all whom it may concern:*

Be it known that I, GEORGE HEDLEY BINDON, a subject of the King of Great Britain, and a resident of the city of Ottawa, in the Province of Ontario and Dominion of Canada, have invented certain new and useful Improvements in Electric Cookers or Heating Units, of which the following is a specification.

This invention relates to improvements in electric cookers or heating units, such as might be used for instance in an electric stove or an electrical heating unit, and the objects of the invention are to provide a simple and effective form of unit that can be readily removed and in which the heating element itself may be readily detached by sliding contact with the terminals on the more permanent portion of the base.

Further objects are to provide a device of this kind that can be used with an electric cooker or adapted to be used as an electric heater with equal satisfaction and economy in construction.

A further object is to provide a device of this character that can be turned out in large quantities and readily marketed.

With these and other objects in view, the invention consists essentially of the improved construction hereinafter described, in detail in the present specification and illustrated by the accompanying drawings.

Referring to the drawings, in which like characters of reference indicate corresponding parts in each figure, and in which.

In the drawings.

A indicates the heating element provided with a suitable base 10 and comprising an upper and lower part, the upper part $10^a$ constituting the resistance holder formed with a plurality of grooves 11 therein adapted to receive the resistance wires $12^a$ and extending in the manner indicated on the surface of the member A, the wires being supported and protected by cross lugs or bridges 12. 13 are slidable contact pins in sockets 14 in the base 10 between the heating element and said base.

Figure 1:
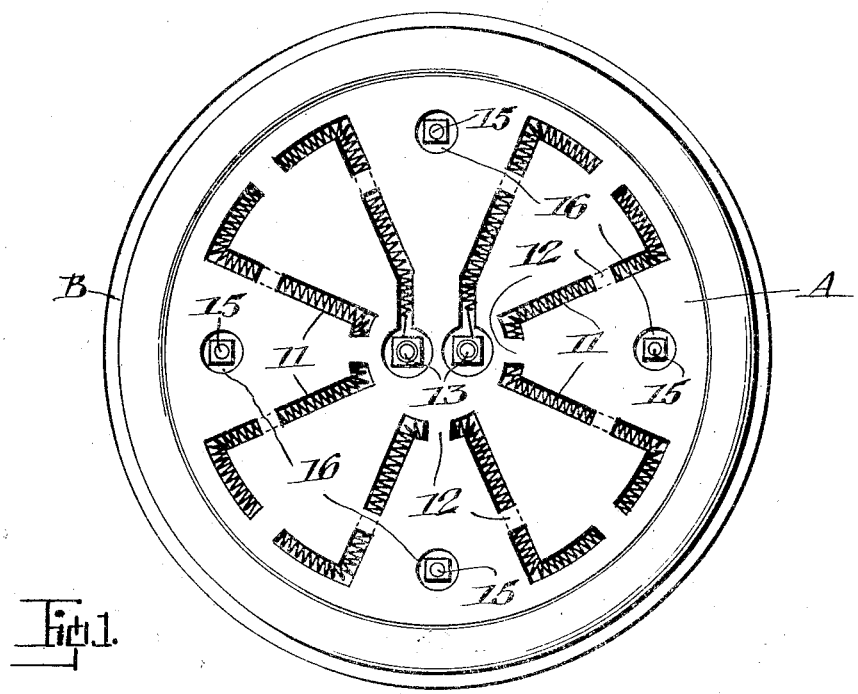
Figure 1 is a plan view of an embodiment of the invention.
Figure 2:
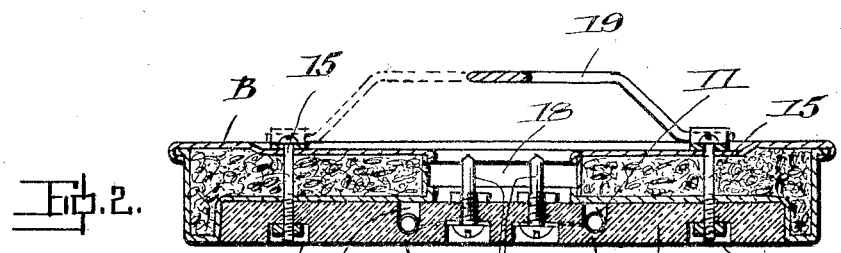
Figure 2 is a vertical section showing the heating element adapted for alternative use.
Figure 3:
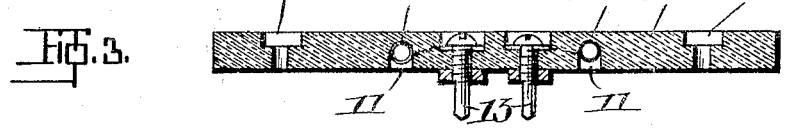
Figure 3 is a sectional elevation of the heating element.

B is a cover or lid in which the heating element A may be mounted, as shown in Figure 2, the element being reversed in position and secured to the cover by means of bolts 15 extending through the cover and having nuts extending in recesses 16 in the member A. Contact pins 13 of the heating element project into an opening 18 provided in the cover into which the usual electric connecting plug may be inserted. The material used may be of any suitable kind and preferably plastic.

Figure 7:
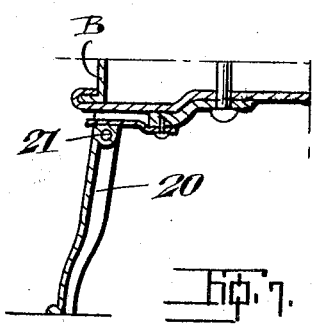
Figure 7 is a sectional detail of the foldable legs for the lid or cover.

19 is a suitable handle pivotally connected to the cover. This cover is here shown as provided with supporting legs 20 adapted when not in use to be folded beneath the cover, as shown in Figure 7, by being pivotally mounted at 21. The cover may also be used without these legs or otherwise.

22 are projecting lugs formed on the base 10 and adapted to receive and support a suitable casing member thereon designed to form a cooker or for any other purpose that may be required, in combination with said base.

From the foregoing, it will be seen that I have provided an interchangeable heating element that can be used with an electric cooker or otherwise. To make a perfect cooker with this interchangeable heating element, it is only necessary to provide a suitable formed casing adapted to fit on the supporting lugs of the base 10 having the heating element A therein. This casing is then provided with a suitable cover or lid B, as illustrated, in which another heating element A is fitted but in reversed form, as illustrated, when the electric oven or cooker is then complete.

Figure 4:
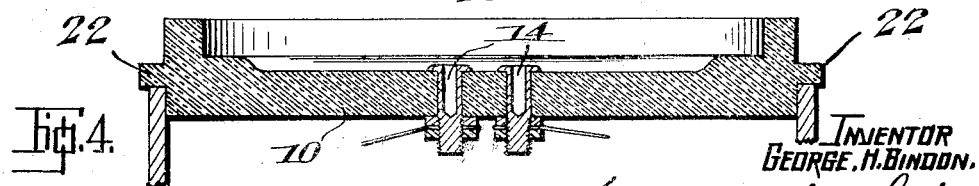
Figure 4 is a sectional elevation of the supporting member in position.
Figure 5:
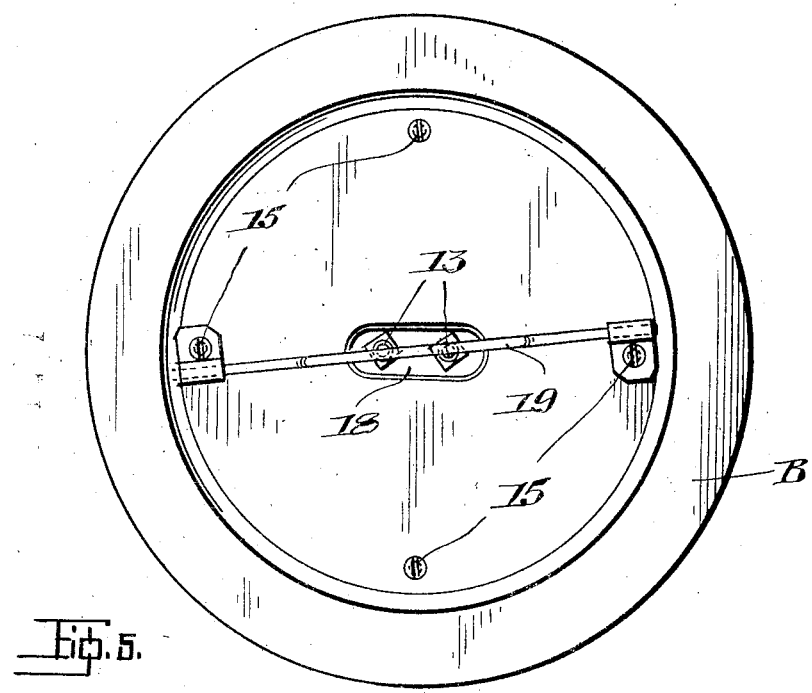
Figure 5 is a plan view of the lid or cover.
Figure 6:
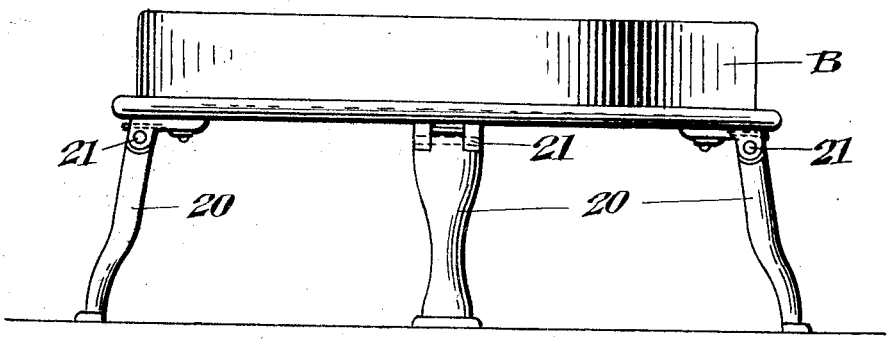
Figure 6 is a side elevation, showing the lid or cover converted into a stand for a heater or grid.

For ordinary cooking by electricity, it is only necessary to use the base provided, as shown in Figure 4, with my heating unit A, to form an electric stove.

To provide a readily transportable heater for rooms or otherwise, I use the lid B, as here illustrated, with my heating unit reversed and fitted therein, the lid being provided with suitable supporting means which, when not in use, can be folded. The lid is also provided with a handle for carrying it about when converted into a heater.

It will thus be seen that I have provided, as claimed, a simple and effective form of interchangeable unit that can be readily duplicated and removed and in which the heating element itself may be readily detached through sliding contact with the terminals on the more permanent portion of the base.

As many changes could be made in the above construction and many apparently widely different embodiments of my invention within the scope of the claims, constructed without departing from the spirit or scope thereof, it is intended that all matter contained in the accompanying specification and drawings shall be interpreted as illustrative and not in a limiting sense.

What I claim as my invention is:

1. An electric heater comprising a heating unit, a receiving member adapted to house and support the heating unit, casing supporting means on the receiving member, and collapsible supporting means for the receiving member, and a second receiving member adapted to form a lid and designed to house the heating unit in an inverted position therein.

2. An electric heater of the character described comprising a heating unit, a receiving member adapted to house and support the heating unit, casing supporting means on the receiving member and collapsible supporting means for the receiving member, a second receiving member adapted to form a lid and designed to house the heating unit in an inverted position therein, and collapsible handling means for said second receiving member.

3. An electric heater of the character described comprising, in combination with a heating unit, a pair of receiving members, one of said members being formed with a recessed centre having a flange therearound adapted to receive and support the heating unit, a flange on the outside of said member adapted to support a casing, and supporting legs for said member adapted to collapse therebeneath in folded position, the other of said receiving members being designed to form a cover or lid to receive therein a heating unit in inverted position, and collapsible handling means for the second receiving member.

4. In an electric cooker of the character described, a heating unit provided with a heating element, a pair of receiving members adapted respectively to form a stand and a cover, means formed on the outer periphery of one of said members designed to support a casing whereby a cooker is formed, and means including spaced contact pins for supporting and retaining the heating unit in normal position in one of the receiving members, means for securing and supporting the heating element in normal position in one of said receiving members, means for securing the heating element in inverted position in the other or lid receiving member, contact pins carried by the heating unit designed to engage with recesses in said receiving members, and collapsible supporting means for one of the receiving members, and collapsible handling means for the other receiving member.

5. In an electric heater of the character described, the combination with a heating unit, of a pair of receiving members adapted respectively to form a stand and a lid, and provided with means for supporting a casing, and a reversible heating unit adapted to fit into one of the receiving members in normal position and into the other receiving member in a reverse position.

6. In an electric heater of the character described, the combination with a base receiving member adapted to form a stand and formed with casing supporting means, of a second receiving member adapted in combination with the first receiving member and a casing to form a lid having collapsible handling means and a reversible heating unit designed to fit into the base receiving member in normal position and into the lid receiving member in reverse position, and means for retaining the heating unit in position in said receiving members.

In witness whereof I have hereunto set my hand in the presence of a witness.

GEORGE HEDLEY BINDON.

Witness:
Wm. Cuff Quin.